F. B. BELL.
PROCESS OF FORGING AND DIES THEREFOR.
APPLICATION FILED SEPT. 18, 1918.

1,381,102.

Patented June 14, 1921.
10 SHEETS—SHEET 1.

F. B. BELL.
PROCESS OF FORGING AND DIES THEREFOR.
APPLICATION FILED SEPT. 18, 1918.

1,381,102.

Patented June 14, 1921.
10 SHEETS—SHEET 2.

F. B. BELL.
PROCESS OF FORGING AND DIES THEREFOR.
APPLICATION FILED SEPT. 18, 1918.

1,381,102.

Patented June 14, 1921.
10 SHEETS—SHEET 5.

F. B. BELL.
PROCESS OF FORGING AND DIES THEREFOR.
APPLICATION FILED SEPT. 18, 1918.

1,381,102. Patented June 14, 1921.
10 SHEETS—SHEET 9.

Fig. 11.

UNITED STATES PATENT OFFICE.

FRANK B. BELL, OF PITTSBURGH, PENNSYLVANIA, ASSIGNOR TO EDGEWATER STEEL COMPANY, OF PITTSBURGH, PENNSYLVANIA, A CORPORATION OF PENNSYLVANIA.

PROCESS OF FORGING AND DIES THEREFOR.

1,381,102. Specification of Letters Patent. Patented June 14, 1921.

Application filed September 18, 1918. Serial No. 254,575.

*To all whom it may concern:*

Be it known that I, FRANK B. BELL, a citizen of the United States, residing in Pittsburgh, in the county of Allegheny and State of Pennsylvania, have invented a new and useful Improvement in Processes of Forging and Dies Therefor, of which the following is a specification.

This invention relates in general to die forging and has more particular reference to the forging of heavy metal pieces of irregular shape and which require the utilization of considerable pressure by the dies. It will, however, be manifest that the invention may be used to advantage in the forging of smaller pieces.

This invention has for a principal object the provision of a process and dies for operating it, which will greatly reduce the amount of forging pressure and power required to form the forged article.

A highly important object of the invention also is the provision of such a process and dies for making forgings of considerable dimensions.

Another object of the invention is the provision of such a process which may be easily and economically practised upon a commercial scale.

Figure 1:
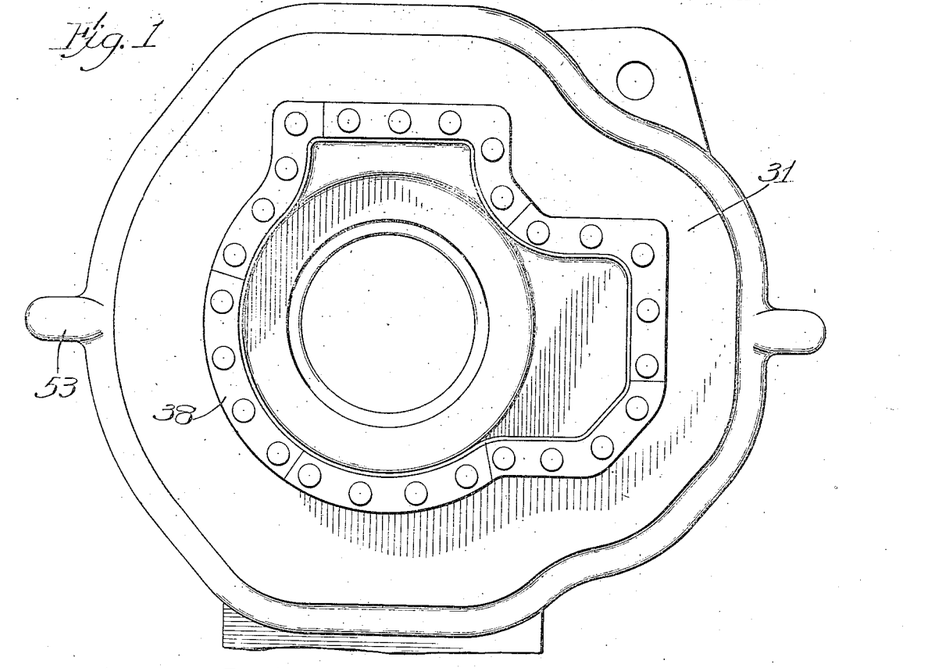
Figure 1 is a top plan view of the female die used in the present preferred embodiment of my invention.

The forging shown on the drawing is a breech ring of 155 milimeter gun and consists of the main substantially cylindrical body 21 from which extend out lugs 22 and through which is provided a central bore 23 having a larger portion 24 at the lower end in the figure. The female die shown in Fig. 1 (and indicated generally throughout the figure by the reference character 31) is adapted to give the external peripheral shape to the body except above the lugs 22 and the shape of this die may be readily understood by comparing Fig. 1 with the other figures which are shown in vertical section.

The female die is provided with an opening or aperture 32 through its bottom, which aperture is enlarged throughout the upper part of its length at 33 to provide a shoulder 34 upon which rests a shoulder 35 of a lower male die 36 which has a stem 37 extending through the lower or more restricted part of the aperture 32. At the top the female die is provided with a sectional ring 38 which, as will be later described, facilitates removing the completed forging from the die.

Figure 2:
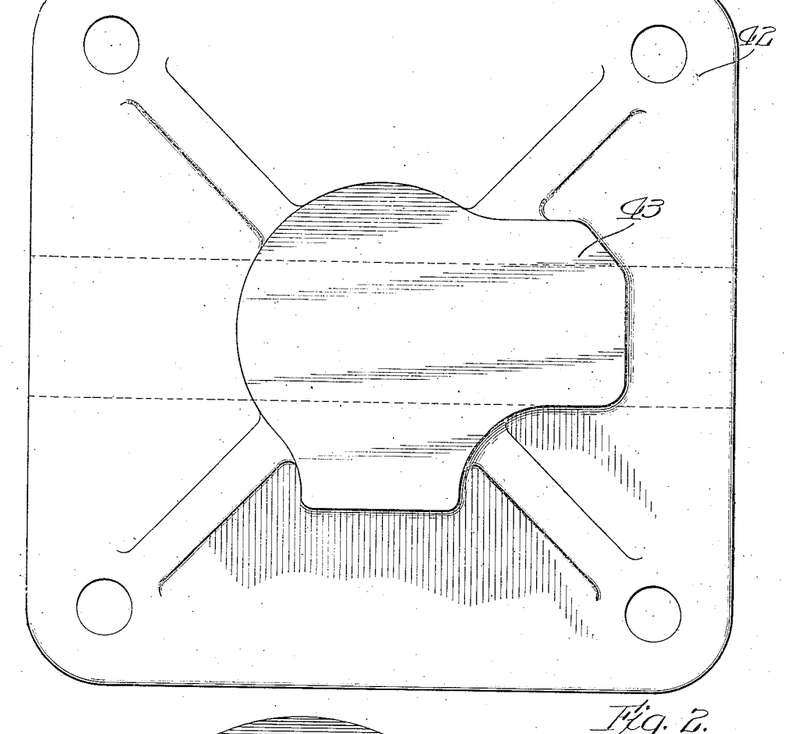
Fig. 2 is a bottom plan view of the upper flat or flattening die.
Figure 5:
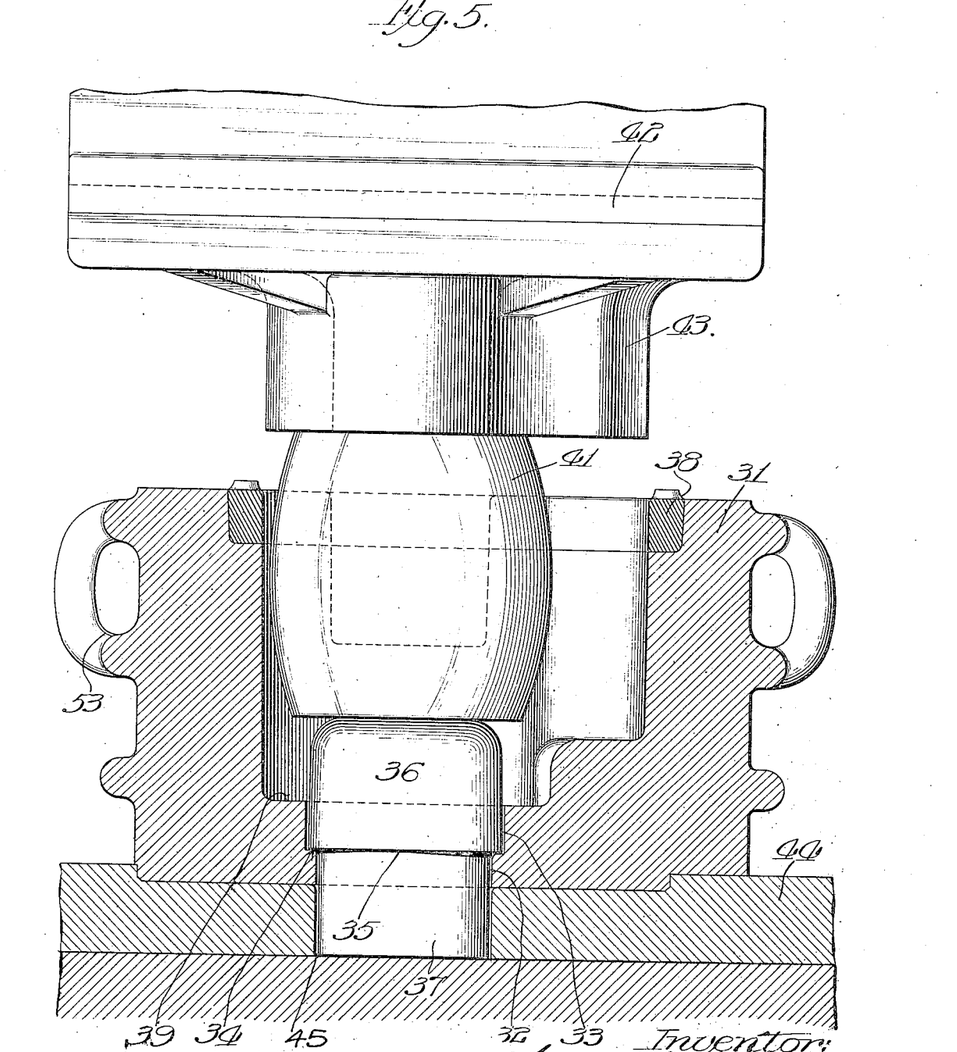
Fig. 5 is a section showing the initial step in forging and the arrangement of the parts before application of power.

The lower male die 36 extends above the bottom die surface 39 of the female die and upon it is placed the ingot or blank 41 which has been preferably previously compressed to the barrel-like formation or shape disclosed in Fig. 5. The upper flat or flattening die, indicated at 42 in most of the figures and shown in bottom plan in Fig. 2, has a lower flat operating portion 43 of the shape of the entrance into the female die.

Figure 3:
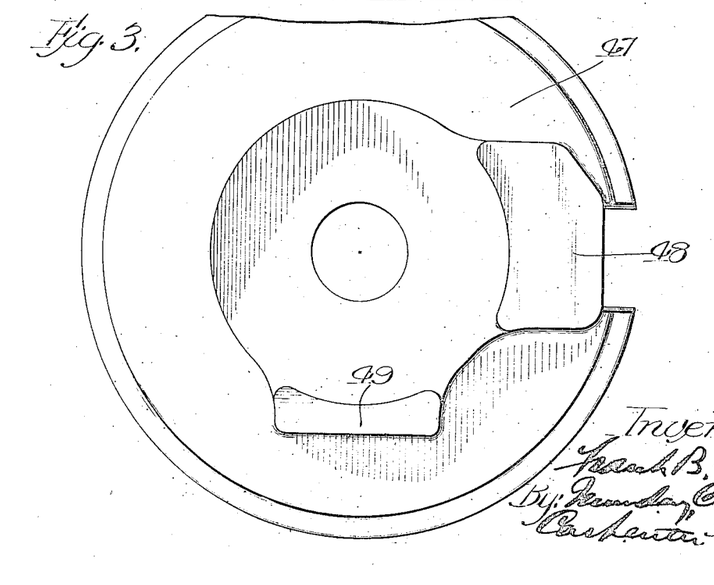
Fig. 3 is a similar view of the upper forming die.
Figure 4:
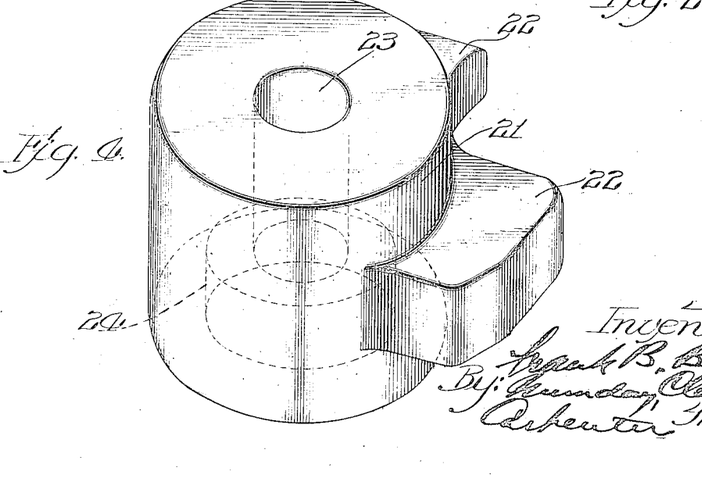
Fig. 4 is a perspective view of the forging particularly adapted to be made by the dies shown on the drawing.
Figure 6:
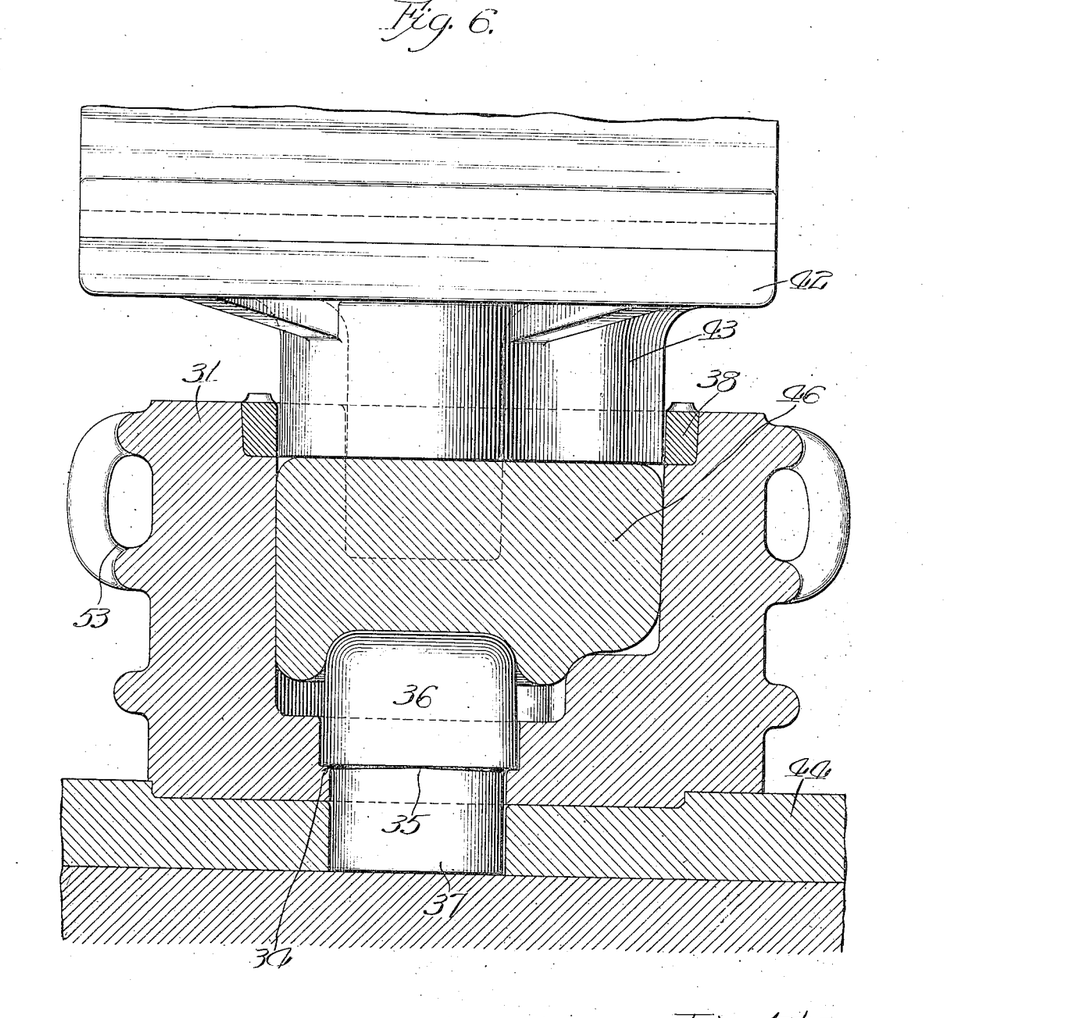
Fig. 6 is a similar view showing the action of the upper flat or flattening die.
Figure 7:
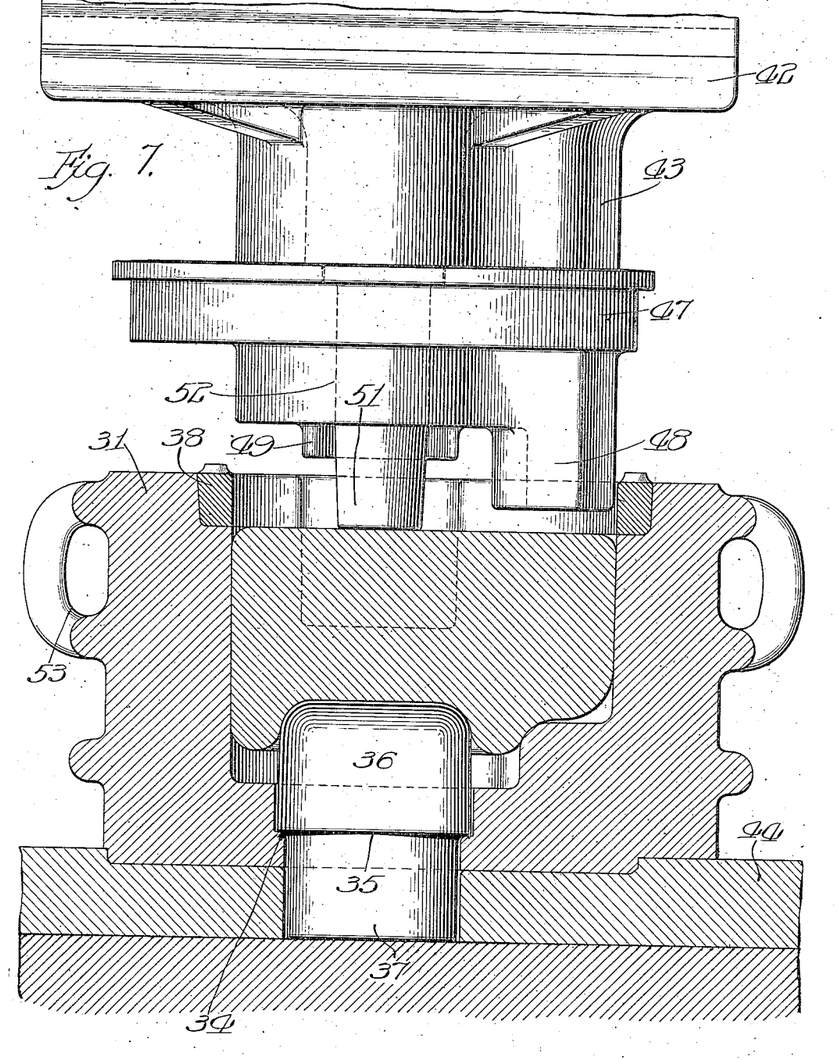
Fig. 7 is a similar view showing the arrangement of the two upper dies and the parts prior to the operation of the upper forming die.
Figure 11:
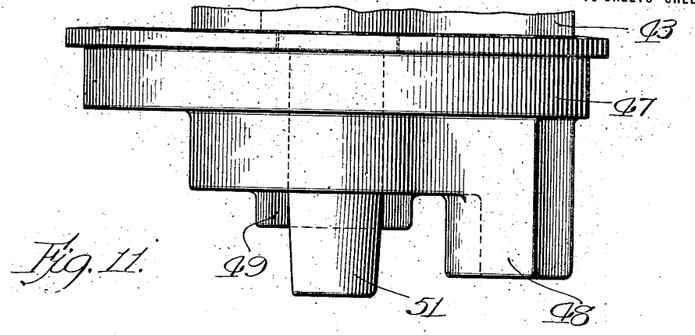
Fig. 11 shows the removal of the forging from the female die.
Figure 12:
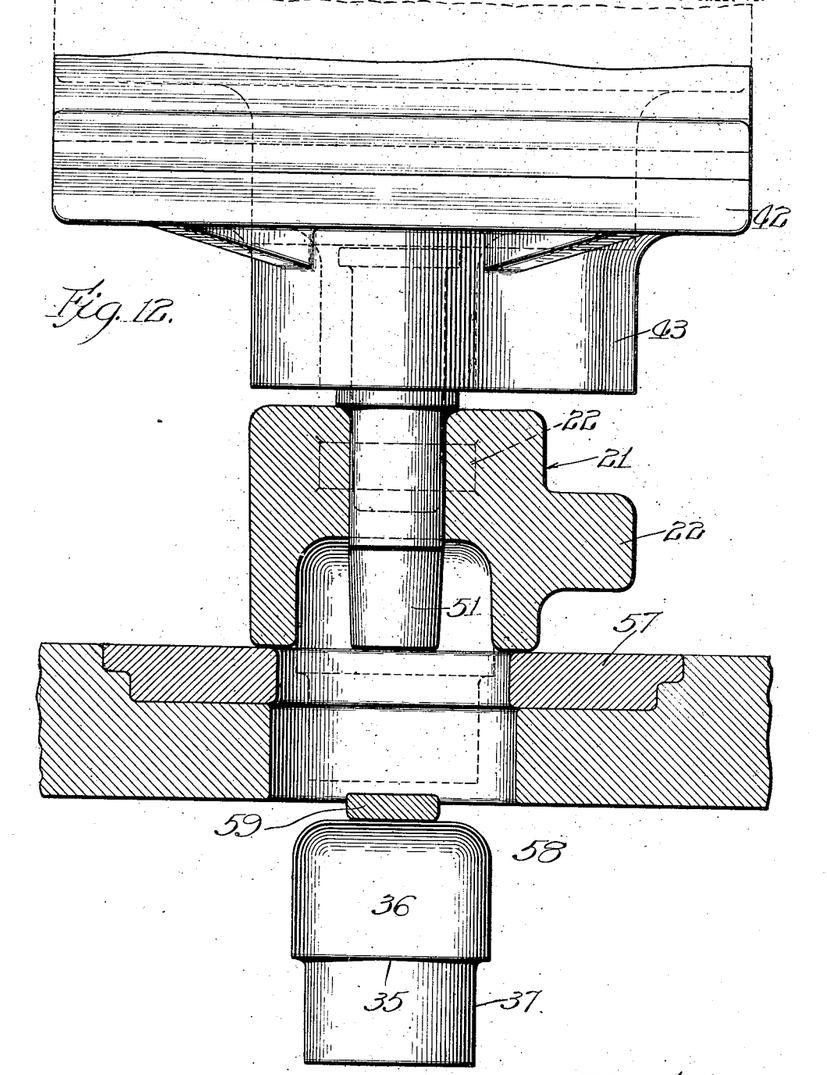
Fig. 12 shows the final operation in making the forging disclosed in Fig. 4.

In practising this embodiment of my invention, the female die is placed upon a suitable support 44 of a die press which has an opening 45 into which the stem or tail 37 of the lower male die may extend, the blank is placed upon lower male die 36, all in alinement with the upper flat or flattening die 42, as may be observed by viewing Fig. 5. Pressure is then applied to the upper die 42 in any suitable fashion and this die forced down upon the blank or ingot bringing it to the shape indicated at 46 in Fig. 6. The upper flattening die is caused to penetrate merely a short distance within the female die, this distance may or may not, as desired, be sufficient to compress the metal below the lower edge of the segmental or divided ring 38. Upon the completion of this operation the upper male forming die (generally indicated at 47) is inserted beneath the upper flat or flattening die 42 and this die, as may be seen by comparing Figs. 3, 7 and 11, has an outside superficial shape fitting within the female die and has also downwardly extending projections 48 and 49 adapted to determine the upper surfaces of the lugs 22. It carries also a center punch or male member 51 which extends through a suitable recess 52 in the die. It is intended in the present embodiment of my invention that this male forming die receive its pressure through the flattening die 42 and the parts are therefore arranged as shown in Fig. 7.

Figure 8:
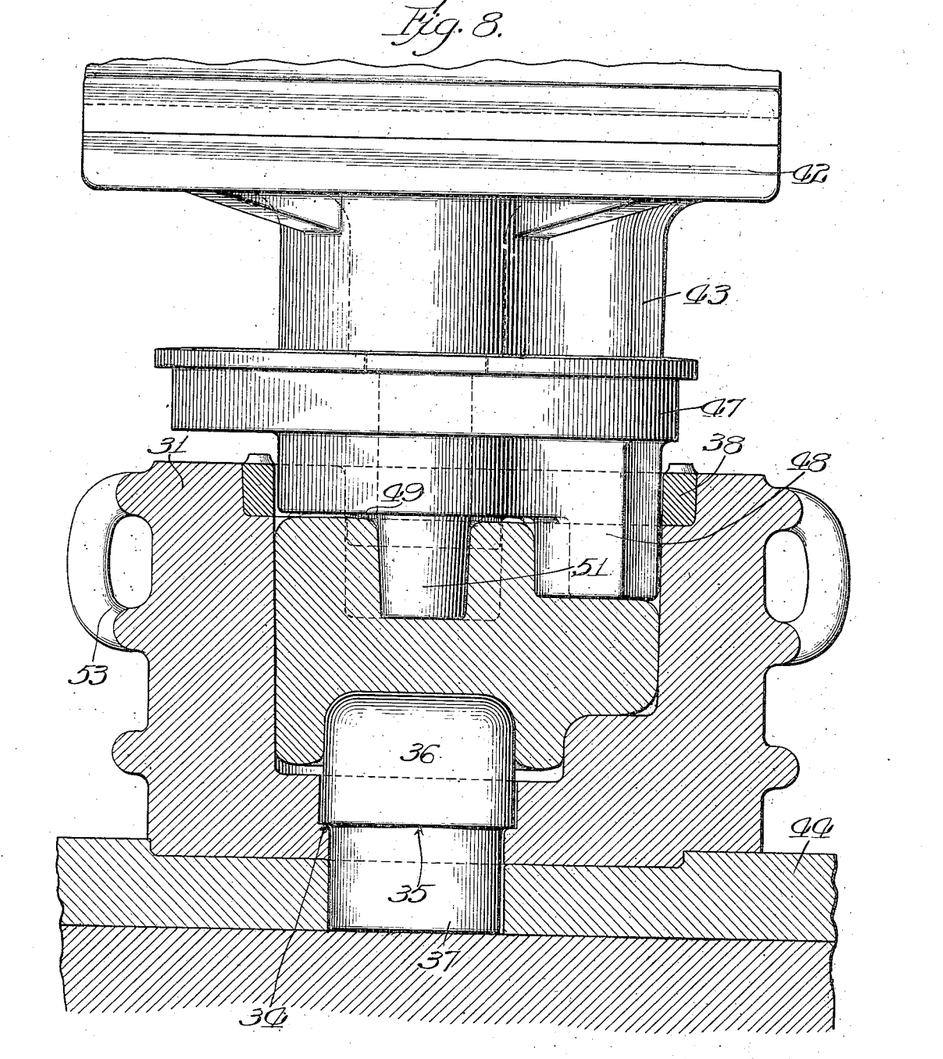
Fig. 8 shows the action resulting from the operation of the upper forming die.
Figure 9:
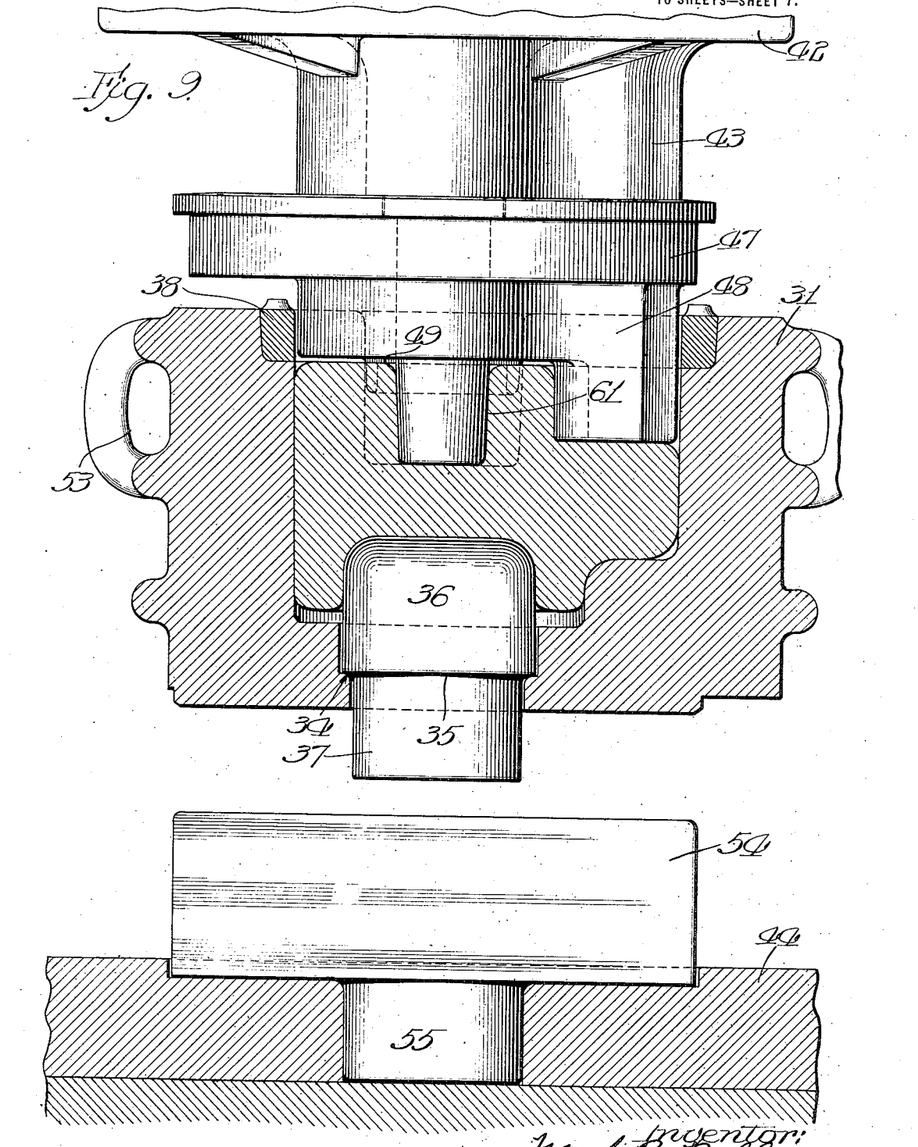
Fig. 9 is a similar view showing the parts prior to the action of the lower forming male die or penetrating die.
Figure 10:
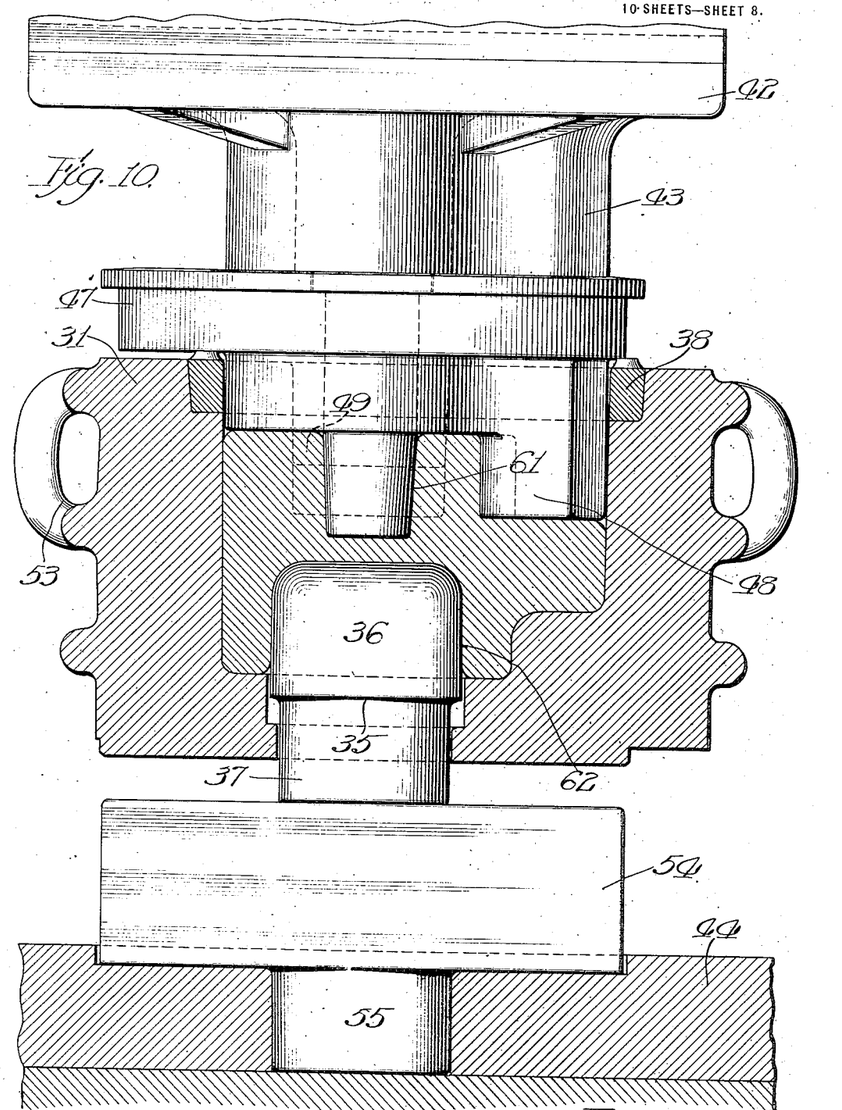
Fig. 10 shows the completion of the forging operation proper.

The second descent of the flattening die 42 forces the forming male die 47 down into the female die (as indicated in Fig. 8) bringing the forging to the approximate but not accurate shape desired. Parts are now lifted by engagement of suitable lifting members (not shown) with arms or eyes 53 on the female die and the block 54 is inserted beneath the tail 37 of the lower male forming die 36, this block preferably having a tail 55 fitting in the aperture 45 of the support. The parts are then lowered upon this block and pressure is again applied through the upper flattening die through the upper forming die to the forging, which pressure is concentrated upon the lower forming die 36 which, as has been described, is carried by and in the female die. This pressure carries the entire structure down against the block 54 and results in a powerful upward reacting pressure forcing the lower forming die to penetrate the forging and to force the material out to fill up accurately the corners and more remote locations in the female die. The result of this action is apparent upon viewing Fig. 10. During this time the female die is permitted to float so that the metal flowing out under the action of the bottom punch is free to carry the female die either up or down and thus obviate the possibility of the formation of strains or cracks in the metal being forged as might at times occur if the female die were rigidly connected either to the top or bottom die or punch during this period in the formation.

The parts are now again lifted and positioned upon an upwardly extending stud or projection 56, the tail 37 of the member 36 resting upon this stud or projection. The female die is now forced down with resulting lifting of the forging through the action of the member 36 out of the female die, as may be observed in Fig. 11. The forging with the member 36 still in it is placed upon a suitable support 57 having an opening 58 through it of sufficient diameter to permit the passage of the member 36. The punch or die member 51 is then inserted in the aperture previously formed by it and the flattening die brought down. This action results in the punching out of the material 59 located between the two recesses 61 and 62 formed in the forging by the members 36 and 51 in the completion of the action within the female die. During this action the member 36 is also forced out.

The forcing action exerted by the penetration of the member 36 occurs under a very greatly intensified force, which action, in the practice of the embodiment described, may be as high as 5,000 tons concentrated upon the member 36, and this member in the present instance may have a diameter of 13½ and 14 inches. It will be understood that the forging described in the particular instance has overall dimensions in excess of two feet.

The sectional ring 38 acts not only as a wearing ring and facilitates the removal of the piece but possesses the additional and important function, from a practical standpoint, of preventing or minimizing wear and tear where the dies fail to mate with complete accuracy. The segments are, of course, much cheaper and simpler to manufacture and machine and replace than an entire new die would be and experience has demonstrated that it is possible to make forgings without doing any work on the interior of the female die except to machine the wearing ring parts.

It is thought that the invention and many of its attendant advantages will be understood from the foregoing description, and it will be apparent that various changes may be made in the form, construction and arrangement of the parts without departing from the spirit and scope of the invention as set forth in the appended claims or sacrificing all of its material advantages, the form hereinbefore described being merely a preferred embodiment thereof.

I claim:

1. A process of die forging metal, comprising bringing the metal to substantially the form desired in a die by pressure exerted over the entire face of the blank or ingot, and bringing the thus nearly completed forging to accurate final shape through concentrating substantially the entire force of forging upon a penetrating member smaller than a face of said forging and movable within said die.

2. A process of die forging, which comprises bringing the blank or ingot to nearly desired shape by pressure applied to a face of said blank or ingot while in the die with the pressure distributed over the face of said blank or ingot, and substantially completing the formation of said forging by a penetrating member movable within said die and upon which the force is concentrated and applied through the forging.

3. A process of die forging, which consists in bringing the metal to approximate formation in a die by pressure exerted upon one of the faces of the metal, subsequently forcing into said metal a movable penetrating member from the side opposite said initially applied force to complete the formation.

4. A process of die forging, which comprises forcing the metal in a die to partial formation through the successive use of male dies operating upon substantially the entire surface of the metal in a female die, and inserting into said metal a penetrating member under the pressure of the last of said male dies to complete the formation.

5. A process of making apertured forgings wherein the aperture is of different dimensions, which comprises forming the forging with spaced alined recesses of different diameters and on opposite sides, and removing the material between them by the action of a die or punch of diameter equal to the diameter of the smaller recesses.

6. A process of making apertured forgings wherein the aperture is of different dimensions, which comprises forming the forging with spaced alined recesses of different diameters and on opposite sides, and removing the material between them by the action of a die or punch of diameter equal to the diameter of the smaller recesses and while the punch or die of the larger recess is still in said recess, said punch of larger diameter moving out of each recess as the punch or die of smaller diameter removes said material.

7. A process of die forging, which comprises the placing of a blank or ingot upon a movable member in a female die with its upper end extending above the die, compressing said blank or ingot down upon said member, lifting said female die and supporting said female die member and ingot or blank upon said movable member, and forcing said female die and said blank down upon said movable member to cause said member to penetrate said forging and complete its formation.

8. A process of die forging, which consists in bringing the metal to approximate formation in a die by pressure exerted over the entire face of the metal at one side and subsequently completing the forging by concentrating such force over a restricted area the die being maintained in floating condition during such concentration of force.

9. A set of dies for die forging, comprising a female die and top and bottom male die successively operable.

10. A set of dies for die forging, comprising a female die, a plurality of male dies successively operable, one of said dies being operable from the side opposite the others and being adapted to feel the full pressure of forging and apply said pressure to a relatively small area of said forging.

11. A set of dies for die forging, comprising a female die, a top die for determining the shape of the top of the forging, and a movable bottom die carried by and in said female die.

12. A set of dies for die forging, comprising a female die, a flattening die, a top forming die, said top forming and flattening dies being arrangeable with the top forming die beneath the flattening die to cause the top forming die to receive pressure from the flattening die in its forming operation.

13. A set of dies for die forging, comprising a female die, an internal male die movable in said female die and normally protruding therebeyond, said internal male die acting first merely as a part of said female die, and subsequently as a forming male die under the pressure applied to said metal to cause said die to perform a forming operation.

14. A set of dies for die forging, comprising a female die, a bottom male forming die inside said female die and protruding therebeyond, said female die being movable downward relatively to the forging and its supporting member, whereby said forging is ejected from the female die.

15. A set of dies for die forging, comprising a female die, upper and lower penetrating male dies providing alined recesses in the forging having spaced bottoms, the upper one of said male dies removing the material between said bottoms upon subsequent action.

16. A set of dies for die forging, comprising a female die, upper and lower penetrating male dies providing alined recesses in the forging having spaced bottoms, the upper one of said male dies removing the material between said bottoms upon subsequent action against a minor resisting pressure of the other male die.

17. A set of dies for die forging, comprising a female member in which the blank is forged and from which it may be ejected, such female member having a removable sectional portion about the opening through which the forging is ejected to facilitate removal of the forging.

18. A set of dies for die forging, comprising a female member in which the blank is forged and from which it may be ejected, such female member having a removable portion divided into sections about the opening through which the forging is ejected to facilitate removal of the forging.

19. A set of dies for die forging, comprising a female member in which the metal being forged is formed and into which every die of such set enters, and having a removable sectional portion about the opening for the entrance of said die.

FRANK B. BELL.